United States Patent [19]

Kimura et al.

[11] Patent Number: 5,138,766
[45] Date of Patent: Aug. 18, 1992

[54] ROLLER FOR TRANSPORTING SHEET-LIKE MATERIAL AND METHOD FOR MANUFACTURING THE SAME

[75] Inventors: Tsutomu Kimura, Tokyo; Kenji Inoue, Kanagawa, both of Japan

[73] Assignee: Fuji Photo Equipment Co., Ltd., Kanagawa, Japan

[21] Appl. No.: 682,481

[22] Filed: Apr. 9, 1991

[30] Foreign Application Priority Data

Apr. 26, 1990 [JP] Japan ................... 2-111457

[51] Int. Cl.$^5$ .................. B21B 31/08; B60B 5/00; B60B 21/00
[52] U.S. Cl. ..................... 29/895.212; 29/895.21; 29/895.32; 29/132
[58] Field of Search ........... 29/895.2, 895.21, 895.212, 29/895.22, 895.32, 132

[56] References Cited

U.S. PATENT DOCUMENTS

| | | | |
|---|---|---|---|
| 2,005,885 | 6/1935 | Brindley | 29/895.21 X |
| 2,464,082 | 3/1949 | Hart | 29/895.32 |
| 3,823,456 | 7/1974 | Schneider et al. | 29/895.32 |
| 4,662,045 | 5/1987 | Grödum | 29/895.212 |

FOREIGN PATENT DOCUMENTS

| | | | |
|---|---|---|---|
| 55-39368 | 3/1980 | Japan . | |
| 0031436 | 2/1982 | Japan | 29/895.22 |
| 0083229 | 4/1988 | Japan | 29/895.212 |

*Primary Examiner*—Timothy V. Eley
*Assistant Examiner*—C. Richard Martin
*Attorney, Agent, or Firm*—Sughrue, Mion, Zinn Macpeak & Seas

[57] ABSTRACT

A roller for transporting sheet-like material is manufactured by forming a cylindrical resin layer on the periphery of a preheated aluminum pipe, cutting the aluminum pipe covered with the resin layer to a desired size, and joining coaxially oriented shaft end members to both ends of the cut aluminum pipe. The resin layer can be covered on the periphery of the aluminum pipe by use of an extrusion molding machine. A contoured surface on the pipe or an adhesive can help the resin adhere to the pipe. The roller thus manufactured has high stiffness, roundness, less runout and good dimensional stability over a wide temperature range. The weight of the roller is light and maintenance of a rack which is installed with the rollers by the user is easy.

14 Claims, 3 Drawing Sheets

ROLLER FOR TRANSPORTING SHEET-LIKE MATERIAL AND METHOD FOR MANUFACTURING THE SAME

BACKGROUND OF THE INVENTION

The present invention relates to a roller for transporting sheet-like material and a method for manufacturing the roller. An automatic processing apparatus for processing an imagewise exposed light-sensitive material during its transportation is provided with a plurality of transporting rollers for transporting the light-sensitive material and a plurality of guide rollers for guiding the light-sensitive material. These rollers of the automatic processing apparatus are bridged and rotatably supported between a pair of side plates. The rollers for transporting light-sensitive material receive the rotary force of a motor through gears fixedly mounted to the rollers so that the rollers rotate and nip the light-sensitive material therebetween. Further characteristics such as runout, corrosion resistance to processing solution and smoothness are required for the rollers in the automatic processing apparatus in order to prevent the light-sensitive material from experiencing uneven processing.

To satisfy such requirements, the roller is generally manufactured in such a way that at first paper or cloth immersed in resin is wound in a hollow plastic pipe or a metal core pipe and the pipe is cut in pre-determined lengths. Thereafter, shaft end members that provide rotatable support for the rollers are mounted on both ends of the pipe by an adhesive. However, the production cost of the roller manufactured by the aforementioned process becomes high due to its multiple fabricating processes. In addition, such a roller is heavy. Accordingly, maintenance of an automatic processing apparatus equipped with a rack of such heavy rollers is difficult. Moreover, even in operation, the tank in which the rack is accommodated must be very strong.

Further, a phenolic resin roller having a pipe-shape but made in an extrusion molding process without the use of a core pipe, has been known. However, this type of roller is not suitable for use in a device for transporting sheet-like material in view of its stiffness, runout and roundness. When this type of roller is partly immersed in a liquid, such as a processing solution, in the axial direction, the temperature difference between the liquid and the air above the liquid causes warpage of the roller.

An object of the present invention is to provide a roller for transporting sheet-like material that is easily manufactured and has desirable performance characteristics including reduced weight.

A further object is to provide a method for manufacturing the roller which reduces the production cost by reducing fabricating steps.

Another object of the present invention is to provide a roller, and a manufacturing method for such a roller, suitable for transporting sheet-like material, which has a high degree of stiffness and roundness, and a low degree of runout.

An additional object is to provide a roller and a manufacturing method for such a roller, which has good lo dimensional stability even if the roller is partly immersed in a liquid, such as processing solution, so that warpage in the axial direction of the roller is prevented.

SUMMARY OF THE INVENTION

The above objects, features and advantages of the present invention are accomplished by a roller which comprises an aluminum pipe and a resin layer thereon, the surface of which is extremely smooth so that a grinding process of the roller may be eliminated.

The above objects, features and advantages also are accomplished by a method for manufacturing a roller comprising a first step to pre-heat an aluminum pipe, a second step to form a cylindrical resin layer on the periphery of the aluminum pipe, a third step to cut the aluminum pipe covered with the cylindrical resin layer thereon in a predetermined length and a fourth step to join coaxially shaft end members to both ends of the cut aluminum pipe. The cylindrical resin layer can be covered on the periphery of the aluminum pipe by use of an extrusion molding machine. The roller thus manufactured by the aforesaid method is used for the transportation of a sheet-like material.

DESCRIPTION OF THE PREFERRED EMBODIMENTS

Figure 2:
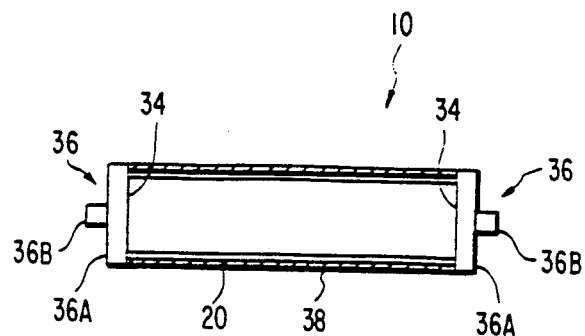
FIG. 2 is a cross-sectional side view of a roller according to the present invention.

A roller 10 of the present invention is shown in FIG. 2. The roller can be used for an automatic processing machine which can process a sheet-like material such as a light-sensitive material, for example, an X-ray sheet film, a graphic art film, etc. The roller 10 is constituted by covering the periphery of an aluminum pipe 20 with a resin layer 38 at a predetermined thickness.

The aluminum pipe 20, preferably a hollow pipe, is of predetermined length and thickness, for example, about 1.0 to 10.0m (preferably 2.0 to 5.0m) in length and about 0.5 to 5mm (preferably about 1 to 2mm) in thickness, having a highly accurate roundness and runout. The thickness of the resin layer 38 is about 0.3 to 3.0mm, preferably about 1.0 to 2.0mm. For instance, an aluminum pipe of 3.0m in length, 1.5mm in thickness and 22mm in outer diameter is covered with polyvinylchloride resin layer of 1.6mm in thickness. The tolerance of the thickness of the resin layer is about 0+0.05mm.

As a resin material 32 of the resin layer 38, a relatively inexpensive PVC (polyvinylchloride), noryl resin or other resins can be used, but a thermoplastic resin preferably is used.

Shaft end members 36 are fixedly mounted on both open ends of the aluminum pipe 20. As the material of the shaft end member 36, the same type of resin as the resin $ layer 38 can preferably be used. The shaft end member 36 comprises a larger diameter portion 36A and a smaller diameter portion 36B. The external diameter of the larger diameter portion 36A is the same external diameter as resin layer 38 and the smaller diameter portion 36B is coaxially fixed to the larger diameter portion 36A. The smaller diameter portion 36B is supported by a bearing (not shown). The manufacturing process of the roller thus constituted will be explained hereinafter.

Figure 1:
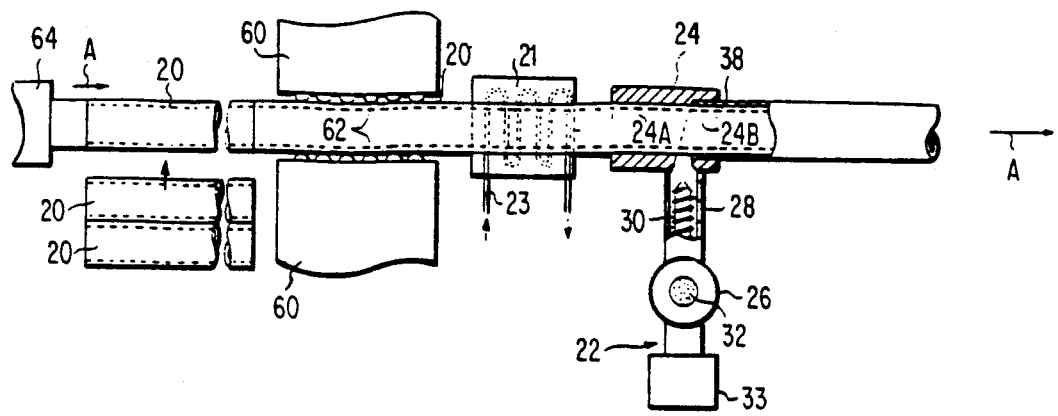
FIG. 1 is a plan view showing a covering process of resin on an aluminum pipe according to a first embodiment of the present invention.

As shown in FIG. 1, the center of an aluminum pipe 20 is placed at the right angle to the heating pipe 28 of an extrusion molding machine 22. The aluminum pipe 20 is supplied by an aluminum pipe supplying machine (not shown) to a pre-heating zone 21 for preheating the aluminum pipe 24 in the range of about 150° C. to 230° C., preferably about 190° C. to 215° C., by use of heating means 23 which may be an electric heater or a microwave generator. The microwave generator can generate microwave of approximately 300,000 Hz of microwave energy. By preheating the aluminum pipe 20, the solidification of resin material 32 or the cracking of resin layer 38 in a die 24 can be prevented. The aluminum pipe 20 is then transported to a passage in the die 24 of heating pipe 28, which is sized to pass the aluminum pipe 20 for being covered with resin. The die 24 is heated by another heating means (not shown) in the range of about 160° C. to about 230° C., preferably about 195° C. to 215° C., so that solidification of the resin material 32 can be prevented. In the Figure, the supplied aluminum pipe 20 is moved at a horizontal right angle to the heating pipe 28 of the extrusion molding machine 22 (arrow "A" direction) by a pipe pushing device 64.

Figure 1A:
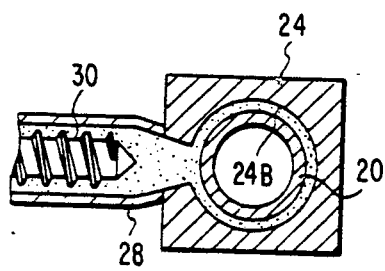
Fig. 1A is a cross-sectional view of an extrusion molding machine according to the present invention.

In the extrusion molding machine 22, resin material 32 supplied from a hopper 26 is melted by heating in the heating pipe 28. The melted resin material 32 is pressed by the screw 30 driven by a motor 33 and extruded from the top end of the heating pipe 28 to the die 24. In the heating pipe 28, the temperature gradient is approximately 165° C. to 190° C. from the hopper 26 to the top end of the heating pipe 28. Thus, a resin layer 38 is formed on the outer periphery of the aluminum pipe 20. In the vicinity of the die 24, a positioning means 60 is placed for adjusting the position of the aluminum pipe 20 and the die 24. A plurality of adjusting rollers 62 is provided at the positioning means 60. The adjusting rollers 62 adjust and maintain the insertion angle of the aluminum pipe 20 to the die 24 so that the clearance between the outer periphery of the aluminum pipe 20 and the inner surface of the die 24 is maintained in a predetermined distance. Thus, a resin layer 38 of uniform thickness is formed on the outer periphery of the aluminum pipe 20 as shown in FIG. 1 and FIG. 1A.

The positioning means 60 is capable of being finely adjusted in a vertical direction or a horizontal direction to the extruding direction of the aluminum pipe 20 (Arrow"A") so that the center of the aluminum pipe 20 can be aligned to the center of the die 24. A round hole 24A is formed in the die 24 and defines the passage through which the aluminum pipe 20 is passed. The round hole 24A is partly enlarged to form a molding circular groove 24B which is a loading portion of the melting resin passed through the heating pipe 28. The molding circular groove 24B is formed at the right side of the die 24 as shown in FIG. 1 and, accordingly, the loaded melting resin is molded on the outer surface of the aluminum pipe 20 passing through the die 24. A molding machine which is generally used for extrusion molding can be used as the extrusion molding machine 22 of the present invention. The aluminum pipe 20 covered with the resin layer 38 may be gradually cooled by the controlled blowing of air and/or water mist (not shown) so that cracking of the resin layer 38 can be prevented. In the next process, as shown in FIG. 2, shaft end members 36 having a shaft made of resin similar to the resin of the covering resin on the aluminum pipe 20 are joined by welding to both ends of the aluminum pipe 20, which has been covered with resin and cut in a required length. The welding is performed by ultrasonic welding or pressure friction welding. In the succeeding process, the surface of the resin layer 38 of the aluminum pipe 20 can be finished by grinding to make a smoother surface of the covering layer by dry honing etc. The grinding process can be accomplished by use of a grindstone which has a broader abrasive grain distance and less bonding degree, and preferably by use of a coolant to prevent grinding frictional heat and loading of the grindstone. The grinding process may be omitted if it is not required.

Figure 3:
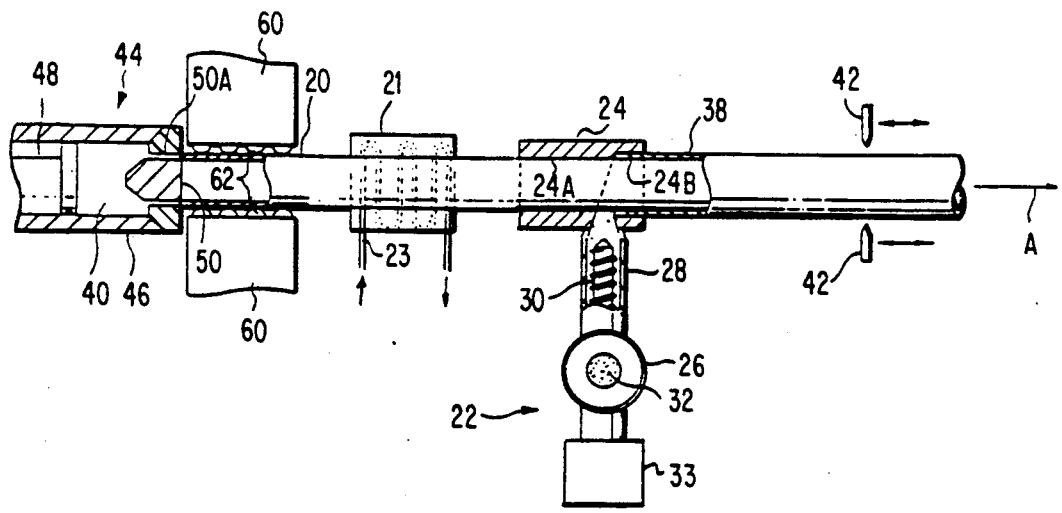
FIG. 3 is a plan view showing a continuous supplying process of aluminum pipes according to a second embodiment of the present invention.

A second example of the present invention is illustrated in FIG. 3. In place of the precut aluminum pipe 20 in the preceding example, an aluminum pipe 20 is made by extruding aluminum ingot 40 by an extruder 44 and is continuously supplied. The extruder 44 comprises a container 46 for accommodating the aluminum ingot 40, a ram 48 for pressing the ingot 40 with high pressure and a die 50 having a slit 50A for extruding the ingot 40 to form an aluminum pipe 20 in the direction of Arrow "A", as shown in FIG. 3. The aluminum pipe 20 thus formed by a continuous extrusion process is placed on the square to the axis of the heating pipe 28 of an extrusion molding machine 22 after preheating of the aluminum pipe 20 in the preheating zone 21 and the outer periphery of the aluminum pipe 20 is covered with resin layer 38 by use of the extrusion molding machine 22. The aluminum pipe 20 covered with resin layer 38 may be gradually cooled, as described in the aforementioned example. The molding machine 22 can be the same type of molding machine as described in the previous example. The aluminum pipe 20 covered with the resin layer 38 is further transported in the direction of Arrow "A" and is cut by a cutter 42 having a saw such as a circular saw which is moved at the same transporting speed as that of the aluminum pipe 20. Accordingly, the aluminum pipe 20 is continuously covered with resin layer 38. In the succeeding process, shaft end members 36 with a shaft are joined at both ends of the aluminum pipe 20 and the outer periphery of the pipe 54 covered with resin can be further ground, as described in the aforementioned example.

Figure 4:
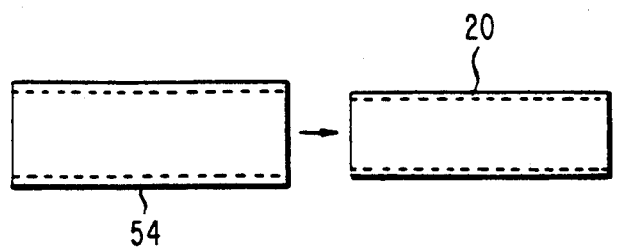
FIG. 4 is a cross-sectional view showing a force fit process of a resin pipe on a periphery of an aluminum pipe o according to a third embodiment of the present invention.

A third example of the present invention is illustrated in FIG. 4. In this example, the aluminum pipe 20 covered with resin layer is not made by use of an extrusion molding machine 22, but a resin pipe 54 which has been formed in a cylindrical form is force-fitted onto the outer surface of an aluminum pipe 20. The force-fitting process can be preferably conducted when the resin pipe 54 is softened by heating. After force-fitting, both ends of the aluminum pipe 20 and the resin pipe 54 may be cut and the outer surface of the resin pipe 54 may be ground if necessary. As is described in the preceding examples, shaft end members 36 may be joined to both ends of the aluminum pipe 20 and the outer surface of the resin pipe 54 may be ground.

Figure 5:
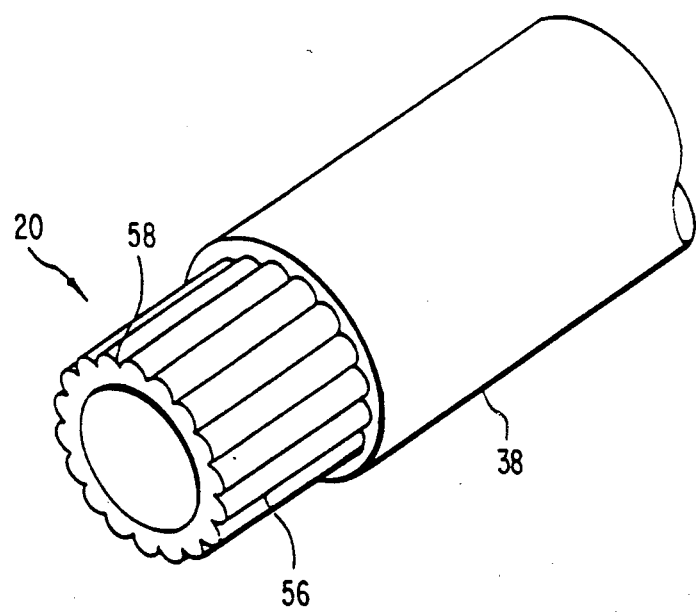
FIG. 5 is a perspective view of an aluminum pipe having a convex and concave peripheral surface thereof.

A fourth example of the present invention is illustrated in FIG. 5. In this example, small longitudinal convex and concave shaped grooves 58 are formed on the outer periphery of an aluminum pipe 20, parallel to the axis of the aluminum pipe 20. The inner surface of the resin layer 38 enters into the concave grooves of the aluminum pipe 20 so that the resin layer 38 is firmly bonded to the aluminum pipe 20. Therefore, when a light-sensitive material is transported by a pair of rollers thus manufactured, a slip between the outer surface of the aluminum pipe 20 and the inner surface of the resin layer 38 is prevented. Other process and structure of the roller are similar to the preceding examples., Further, in addition to the concave and convex shaped surface 58 of the pipe in the above example, other configuration for tightening the joint between the outer periphery 56 of the aluminum pipe 20 and the resin layer 38 thus covered, such as knurling or pin-shaped protrusions can be applied.

In addition, an adhesive can be applied between the outer periphery 56 of the aluminum pipe 20 with or without the concave and convex shaped grooves and the resin layer 38 so that the joint between the outer periphery 56 of the aluminum pipe 20 and the resin layer 38 can be further tightened.

The roller for transporting sheet-like material according to the present invention is not limited to use for an automatic processing apparatus for a light-sensitive material, such as X-ray film and lithographic film, but also can be used for machines for transporting other sheet-like materials.

The rollers according to the present invention are manufactured by reduced production steps and at reduced production cost, as compared to the conventional processes. The weight of the rollers according to the present invention is significantly less than the conventional roller and, accordingly, the devices installed in the rollers are lighter in weight. This results in easy maintenance by users. Also, a tank in which a rack having the rollers according to the present invention is accommodated, does not require high strength. The rollers according to the present invention have high stiffness and roundness, less runout and a good dimensional stability over a wide temperature range.

What is claimed is:

1. A method for manufacturing a roller for transporting sheet-like material, comprising:
   preheating an aluminum pipe;
   forming a cylindrical resin layer comprising a resin material on the outer periphery of the aluminum pipe during heating of said aluminum pipe and said resin material at a common predetermined temperature;
   cutting the aluminum pipe covered with the cylindrical resin layer thereon in at least one predetermined length, thus defining opposing pipe ends; and
   joining coaxially shaft end members to both opposing ends of the cut aluminum pipe.

2. A method for manufacturing a roller for transporting sheet-like material according to claim 1, wherein the step of forming a cylindrical resin layer on the outer periphery of the aluminum pipe is carried out by the use of an extrusion molding machine.

3. A method for manufacturing a roller for transporting sheet-like material according to claim 1, wherein the shaft end member comprises a larger diameter portion for joining coaxially the shaft end member to the pipe end and a smaller diameter portion to be supported by a bearing 4. A method for manufacturing a roller for transporting sheet-like material according to claim 3, further comprising welding at least one shaft end member to the aluminum pipe end by one of ultrasonic welding and pressure friction welding.

5. A method for manufacturing a roller for transporting sheet-like material according to claim 3, wherein the shaft end member is made of resin which is the same type as the resin layer covering the outer periphery of the aluminum pipe.

6. A method for manufacturing a roller for transporting sheet-like material according to claim 1, wherein said forming step comprises force fitting a cylindrical resin pipe on the outer periphery of said aluminum pipe.

7. A method for manufacturing a roller for transporting sheet-like material according to claim 1, wherein the outer periphery of the aluminum pipe has a contoured surface.

8. A method for manufacturing a roller for transporting sheet-like material according to claim 1, further comprising grinding the outer surface of the resin layer.

9. A method for manufacturing a roller for transporting sheet-like material according to claim 1, wherein the aluminum pipe is preheated in the range of about 150° C. to about 230° C. and the cylindrical resin layer is formed on the outer periphery of the aluminum pipe in the range of about 160° C. to about 230° C.

10. A method for manufacturing a roller for transporting sheet-like material according to claim 1, wherein the aluminum pipe thickness in a radial direction is within a range 0.5 to 5.0 mm and the resin layer thickness in the same direction is in the range of 0.3 to 3.0 mm.

11. A method for manufacturing a roller for transporting sheet-like material according to claim 1 wherein the resin layer is polyvinylchloride.

12. A method for manufacturing a roller for transporting sheet-like material according to claim 1, wherein the outer periphery of the aluminum pipe and the resin layer are formed with an adhesive material therebetween.

13. The method according to claim 1, wherein said preheating step is performed by at least one of a microwave generator and an electric heater.

14. A roller for transporting sheet-like material manufactured by the steps comprising:
   preheating an aluminum pipe;
   forming a cylindrical resin layer on the outer periphery of the aluminum pipe during heating,
   cutting the aluminum pipe with the cylindrical resin layer in a predetermined length; and
   joining coaxially shaft end members to both ends of the aluminum pipe to form a roller.

* * * * *